United States Patent
Ryan (10) Patent No.: US 11,036,377 B1
(45) Date of Patent: Jun. 15, 2021

(54) SYSTEMS AND METHODS FOR ENABLING EFFICIENT COMMISSIONING OF LIGHTS USING A MOBILE DEVICE

(71) Applicant: SYNAPSE WIRELESS, INC., Huntsville, AL (US)

(72) Inventor: Michael Aaron Ryan, Huntsville, AL (US)

(73) Assignee: Synapse Wireless, Inc., Huntsville, AL (US)

(*) Notice: Subject to any disclaimer, the term of this patent is extended or adjusted under 35 U.S.C. 154(b) by 46 days.

(21) Appl. No.: 16/378,150

(22) Filed: Apr. 8, 2019

(51) Int. Cl.
| | |
|---|---|
| *G06F 3/0484* | (2013.01) |
| *G06F 3/0482* | (2013.01) |
| *G06F 3/0488* | (2013.01) |
| *H05B 47/19* | (2020.01) |
| *H04L 29/06* | (2006.01) |

(52) U.S. Cl.
CPC ........ *G06F 3/04847* (2013.01); *G06F 3/0482* (2013.01); *G06F 3/0488* (2013.01); *G06F 3/04845* (2013.01); *H05B 47/19* (2020.01); *H04L 67/42* (2013.01)

(58) Field of Classification Search
CPC ........ H05B 45/00; H05B 47/00; H05B 47/19; G06F 3/00; G06F 3/048; G06F 3/0482; G06F 3/04847; G06F 3/04845; G06F 3/0488; H04L 67/42
See application file for complete search history.

(56) References Cited

U.S. PATENT DOCUMENTS

| | | | |
|---|---|---|---|
| 7,242,152 B2 | 7/2007 | Dowling et al. | |
| 9,357,621 B2* | 5/2016 | Lim | H05B 47/175 |
| 9,374,874 B1 | 6/2016 | Ewing | |
| 10,382,284 B1* | 8/2019 | Slupik | H05B 47/19 |

(Continued)

*Primary Examiner* — Jennifer N To
*Assistant Examiner* — Reji Kartholy
(74) *Attorney, Agent, or Firm* — Maynard Cooper & Gale, P. C.; Jon E. Holland (57) ABSTRACT

Lights sources may be installed in a facility without regard to their unique identifiers, which are necessary for a lighting control system to exercise control over the light sources. After installation, a graphical user interface (GUI) executed on a user's mobile device can facilitate the user's identification of the identifier of a particular light source located at a particular position. The GUI displays to the user a map of the facility, onto which the user can delineate the boundaries of a lighting area in which he intends to identify the location of light sources. The user then inputs into the GUI row and column dimensions for the lights positioned within the delineated lighting area. The GUI automatically generates and displays a plurality of selectable lighting positions arranged within the delineated area according to the selected dimensions, without the need for individual placement by the user. The user may then, via the GUI, select a displayed lighting position and execute a search function to find an intended identifier for the light source located at the selected lighting position. The GUI may then store a correspondence between the light source's identifier and its location in the facility. Accordingly, a mapping of a plurality of light sources can be accurately created while improving the efficiency of a user's commissioning of a lighting system.

10 Claims, 9 Drawing Sheets

(56) References Cited

U.S. PATENT DOCUMENTS

| | | | |
|---|---|---|---|
| 2003/0057887 A1* | 3/2003 | Dowling | H05B 47/175 |
| | | | 315/291 |
| 2008/0316730 A1* | 12/2008 | Diederiks | H05B 47/175 |
| | | | 362/85 |
| 2016/0270181 A1* | 9/2016 | Yagi | H05B 45/20 |
| 2016/0381767 A1* | 12/2016 | Tiberi | G06F 3/04847 |
| | | | 715/736 |
| 2017/0048952 A1* | 2/2017 | Roberts | H04W 4/50 |
| 2017/0318650 A1* | 11/2017 | Ando | H05B 45/20 |
| 2017/0359884 A1* | 12/2017 | Hidaka | H04B 10/116 |
| 2018/0092187 A1* | 3/2018 | Hidaka | H05B 47/11 |
| 2019/0098725 A1* | 3/2019 | Sadwick | H05B 47/175 |

* cited by examiner

SYSTEMS AND METHODS FOR ENABLING EFFICIENT COMMISSIONING OF LIGHTS USING A MOBILE DEVICE

RELATED ART

The installation and management of a large-scale, network-enabled lighting solution may be a complex process. Modern lighting control systems typically use preset identifiers, such as network identifiers, to uniquely identify individual wired or wireless lights, communicate with those lights, and control their functions. Therefore, an accurate mapping of identifiers to the location of the physical lights they correspond to is a necessity in the efficient management of a lighting system. However, installers may not be aware at the time of installation of those identifiers or of changing network management needs. As a result, at the end of installation, the physical location of particular lights may be inaccurate or unknown. However, even where installers are aware of the identifiers at the time a set of lights is installed, it may be more efficient or time-sensitive to first install all the lights in place without the added burden of creating a mapping, and then later return to take note of the lights' positioning.

In one known process, installers are given labels to place on and/or near a light during its installation, and to keep a record of in a separate reference location, where a label may include a MAC address for the light. By reference to the information on these labels, a person responsible for creating a mapping of the lights is aware of which lights are installed and their MAC addresses, but is not aware of the respective installation locations of those lights. The installed lights may also, at or after the time of installation, be assigned unique identifiers for ease of management. This set of information may then later be used in a process called commissioning, during which a commissioning agent manually associates identifiers for lights with their respective light installation locations, ultimately producing a map of the locations of all of the lights. This map can be used by a central management system to effectively control and communicate with the lights.

In one known method of commissioning, a light with a particular known MAC address but unknown location is controlled to "blink" (to oscillate between "on" and "off" states) at a rate visible to the naked eye of a user performing the commissioning. When a person commissioning the lighting system sees that the light is blinking, he becomes aware of the installation location associated with the MAC address of the light. The commissioner then, through a graphical user interface (e.g., a 2-dimensional facility map) on a mobile device carried near the light's location, may drag and drop an icon that he has associated with the light's known identifier to the appropriate location on the map. The MAC address of the blinking light is then automatically associated with that map location by a central management system for the lighting installation. Each light is individually instructed to blink during this process, that is, the lights blink one at a time and the light is observed one at a time. As a result, a commissioner is only capable of inputting and dragging-and-dropping information about the lights serially.

In larger facilities, such as industrial high-bay facilities, the scale of the space requires a large number of lights, and the process of manipulating a user interface to drag and drop one icon at a time may become particularly time consuming and otherwise burdensome. In some cases, it may even be difficult or problematic to find a blinking light within a large facility. The serial drag-and-drop actions may, in some instances, stretch the commissioning processing over multiple days where the lights cannot otherwise be managed, creating a bottleneck in the installation process. Further, while the known commissioning process ultimately creates an association between a light's identifier and its location, the processing of manually creating or entering a new name for each light may add an additional burden to the commissioning process.

Accordingly, further techniques for commissioning a set of previously-installed lights are generally desired.

BRIEF DESCRIPTION OF THE DRAWINGS

The disclosure can be better understood with reference to the following drawings.

The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to lighting control systems and methods. In one exemplary embodiment, light sources (such as light emitting diodes, commonly referred to as LEDs) are installed in an indoor, or partially indoor, facility. The light sources (also referred to herein as lights) can be controlled by lighting controllers, which control the operation of one or more respective light sources, and a central lighting management system that communicates with the light sources and the controllers through a wireless network. The central lighting management system is configured to store a mapping of each light source that sets forth an association between the location of a light source and a unique "identifier" for the light source, the identifier being a "name" for the light source which may differ from its assigned MAC address. If this mapping is not created at the time of installation, or if lights are added or moved after an initial installation of lights, a person may have to later create or update the mapping, providing inputs to associate each light and its installation location with the appropriate identifier of the light, as part of a process known as commissioning.

Many indoor facilities, such as warehouses, manufacturing facilities, commercial spaces, or industrial high-bay facilities, may have high ceilings on which lighting devices are positioned uniformly, in, for example, rows and columns, aisles, or other arrangements. A person performing the commissioning process (also referred to as a lighting "commissioner" or "user" of the systems and methods described herein) may use a mobile device with a graphical user interface (GUI) that can take in information on the positions of these rows and columns (or other layout), and the positions of the installed lights in relation thereto.

In one embodiment, a commissioner accesses a 2-dimensional map displayed by the GUI on his mobile device. Through an input device such as a touchscreen, the commissioner specifies a lighting area on the map, the lighting area representing a rectangular space in which he wants to identify certain lights. Upon prompting by the GUI, the commissioner specifies a number of rows and a number of columns corresponding to the number of rows and columns of lights that are intended to be commissioned therein. The GUI then displays positions for the lights within the selected lighting area. In the preferred embodiment, a plurality of empty positions are automatically created and populated into the area drawn in by the commissioner, so as to be superimposed on the map of the facility. In one embodiment, these positions are spaced equidistantly from each other within the lighting area that the commissioner has defined with his stylus. In another embodiment, the system contains pre-set guidelines as to where the lighting positions should be placed and/or how far apart from each other they should be set.

The displayed lighting positions are individually selectable and editable through the GUI. When selecting a lighting position, the commissioner can input information associating that position with a particular light, by entering the light's identifier, and store that associated position in a lighting database for later transmission to a central lighting management server. In one embodiment, the commissioner may select an identifier for a light from a known list of identifiers displayed on the GUI. In another embodiment, the commissioner may search for identifiers containing a certain character string.

Because the GUI pre-positions light positions within a selected area, the commissioner, by using the GUI, may save time and effort that would otherwise be used in individual, serial drag-and-drop positioning of the lights on a map. Further, the GUI places the lights at regular, equidistant locations, thereby conforming their placement on the map to how lights generally would be positioned in commercial or industrial facilities, creating more accurate, standardized placements than what may be achievable via a manual drag-and-drop by a user on a PC or handheld device.

In one embodiment of the disclosure, the commissioner may use the GUI to input information about a particular light source, by associating the light's identifier with its position. For example, in one embodiment, the commissioning agent may pre-assign unique identifiers for each of the installed lights, information about the identifiers being stored in a lighting database. In some embodiments, identifiers may themselves convey meaning or characteristics about a light source, for example, by including character string information about the light source's function or placement in the facility. The GUI may, in preferred embodiments, provide interactive functionalities for the commissioner to select a light source position on a map and enter an identifier for a light source located at that position. Some embodiments may provide a selection function through which all potential identifiers are presented to the commissioner, and a selected identifier may be associated with the correct position on the 2D map. Alternate embodiments may provide a search functionality through which a commissioner may search for a character string in an identifier, and a list of selectable search results may be presented on the display for selection. The user may select in turn each of the lighting positions that were generated and displayed in the lighting area. In the preferred embodiment, where a portion of an identifier is searched for and the search results are displayed on the GUI, those search results may remain displayed even as other lighting positions are selected. By these means, in circumstances where light sources located in a single area of a facility are assigned similar identifiers, those identifiers can be quickly be found and associated with their respective positions without duplicative search efforts, and the commissioning process can be optimized for speed.

Once the commissioner has input lighting information into the GUI, the input information can be transmitted from the mobile device to a central lighting management system. In some embodiments, the transmission of this information occurs after all of the commissioner's intended updates have been entered, however, in other embodiments, the transmission may occur at any time where a wireless or wired connection can be established between the mobile device and other devices in a lighting system.

Figure 1:
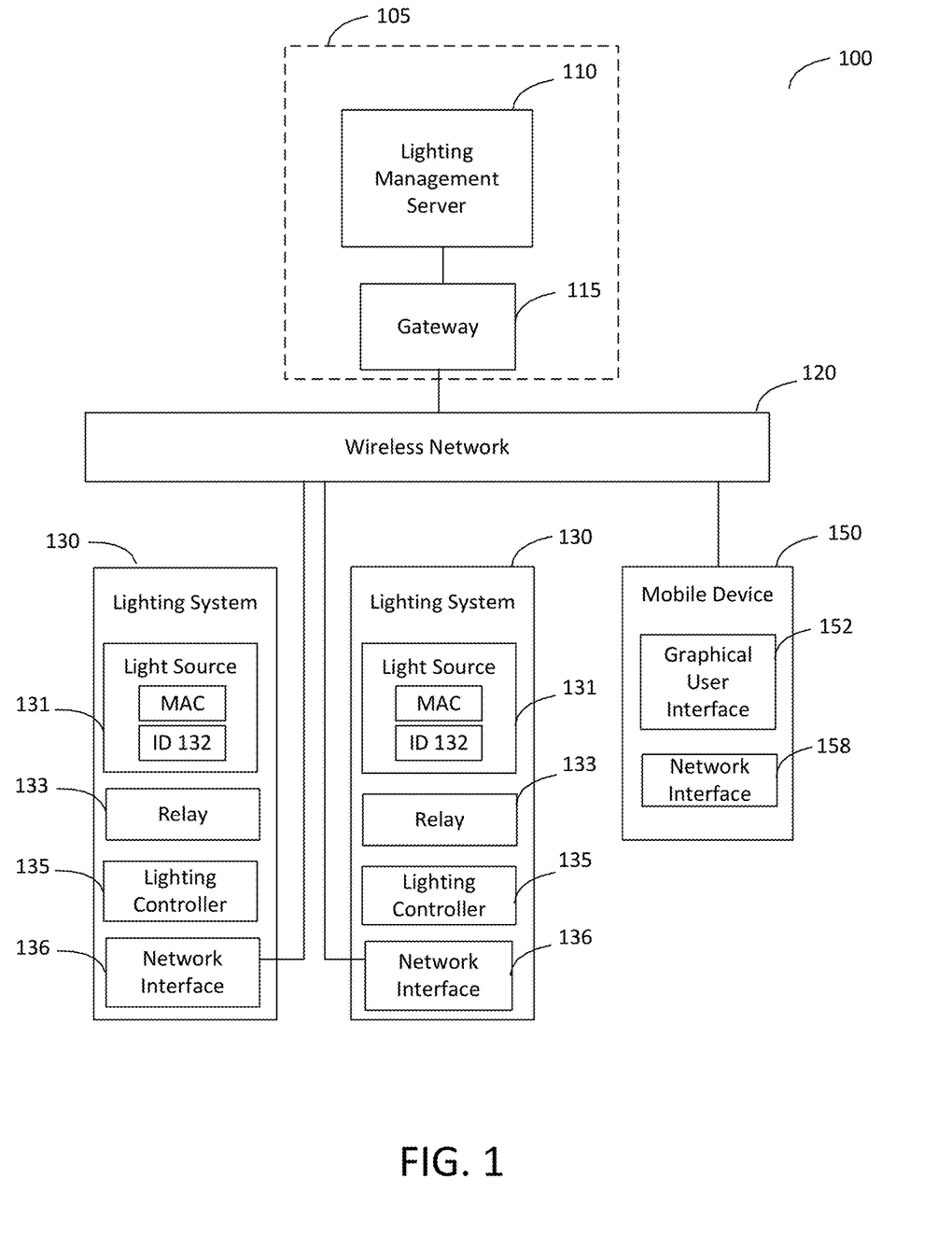
FIG. 1 is a block diagram illustrating an exemplary embodiment of a wireless network in accordance with the present disclosure.

FIG. 1 depicts a block diagram of an exemplary embodiment of a lighting control system 100 installed in an indoor (or largely indoor) space such as a building or warehouse. The lighting control system includes a lighting management server 110 coupled to a gateway 115. In an exemplary embodiment illustrated in FIG. 1, lighting management server 110 and gateway 115 are different logical components in one server 105. In such embodiments, the lighting management server 110 and gateway 115 may reside within the same housing and/or share resources, such as processing hardware or other components, although other configurations of the server 105 are possible. Alternate embodiments may configure lighting management server 110 and gateway 115 to be discrete network devices connected via a wireless or wired connection, or through a network, such as the internet or other type of wide area network (WAN). In some embodiments described herein, if the lighting management server 110 is at a remote location, the gateway 115 may receive messages from a wireless network 120 and encapsulate such messages in accordance with TCP/IP or other protocol for transmission of the messages to the lighting management server 110. Messages from the wireless network 120 to be transmitted to other destinations may be similarly encapsulated or otherwise converted into a different protocol as may be desired. In the opposite direction, the gateway 115 may de-encapsulate messages received from a WAN or other type of network to remove overhead used by the WAN or other type of network for routing messages.

In the embodiment shown by FIG. 1, the gateway 115 connects the lighting management server 110 to one or more lighting systems 130 via wireless network 120. In the preferred embodiment, the wireless network 120 is a network of wireless devices (e.g., lighting systems 130), but different types of wireless or, alternatively, wired networks (or combinations thereof) are possible in other embodiments. In other embodiments (not specifically shown), use of a gateway may be unnecessary and server 105 may instead have a communication device, such as an RF radio, that permits the lighting management server 110 to communicate directly with the wireless network 120 in accordance with the protocol used by the wireless network 120.

In the preferred embodiment shown by FIG. 1, each lighting system 130 comprises a light source 131 such as a light emitting diode (LED) (or if appropriate, a laser diode, a fluorescent lamp, an incandescent light, or other light source), a lighting controller 135 for controlling the light source 131 (e.g., turning it on and off, among other things), a relay 133, and a network interface 136 for communicating via wireless (e.g., radio frequency (RF)) signals, or in some embodiments, via a wired data connection. The light sources 131 illuminate an area of the facility with visible light. The relay 133 is an electrically operated switch configured to supply electrical current to the light source 131 based on control signals from the lighting controller 135. For illustrative purposes, in FIG. 1, only one light source 131 and one lighting controller 135 are shown in each lighting system 130, however in other embodiments any number of light sources 131 and/or any number of lighting controllers 135 may be implemented in each lighting system 130. For example, the system may be implemented to allow a single lighting controller 135 to control two or more lighting systems 130 (not specifically shown). In some exemplary embodiments, each light source 131 is stationary (fixed in place) after installation, however, alternate embodiments may exist wherein a light source can be moved to a different physical location after installation.

In the preferred embodiment of FIG. 1, each lighting system 130 is a distinct node of the wireless network 120 and is independently manageable through use of a MAC address. In addition to its MAC address, each lighting system 130 is assigned a unique network identifier 132 that distinguishes the lighting system from other nodes of the wireless network 120. This network identifier 132 can be used as an identifier in communication over wireless network 120, where a message transmitted over the wireless network 120 through RF transmission can use the network identifier 132 to identify the lighting system 130 as a source or destination of the message. In one embodiment, a network identifier 132 refers to a light source 131 in combination with other components of the lighting system 130. In another embodiment, the light source 131 may be a node of the wireless network 120 physically distinct from its respective lighting controller 135 and the network identifier 132 would in that case be an identifier of the light source 131.

An identifier 132 is, in the preferred embodiment, an alphanumeric character string that is unique to a lighting system 130 among other devices on the wireless network. The identifier may have any value, including randomly generated or invented values, however, in some embodiments, the identifier may be selected by a commissioning/management agent to convey information about the lighting system 130. For example, the identifier 132 may include information that represents a location of the light within the facility (e.g., may include "storage" if located in a storage area) or within a room (e.g., a row, coordinate, or location number), a characteristic of the light or how it should be managed (e.g., the word "motion" if motion-activated), or a sequential order in which the light was installed in the facility (e.g., "light 1," "light 2," etc.), among other things.

Upon installation of a lighting system 130 in a facility, the lighting system may only be known to the lighting management server 110 by its MAC address. The process of identifying the installation location of the lighting system (its position) and associating the lighting system with a unique identifier is referred to as "commissioning" the light. The commissioning process is performed by a user, also referred to herein as a commissioner or commissioning agent, operating a mobile device 150. Although only one mobile device 150 is shown in FIG. 1, it will be understood that any number of mobile devices 150 may be in use in the lighting control system 100 at a given time. A mobile device 150 may, in the preferred embodiment, be a mobile computing device such as a smartphone, PDA, tablet, laptop computer, or a handheld peripheral device, among other types of devices, so long as the mobile device is configured to display to its user a graphical user interface (described in greater detail herein). Further, despite the reference to a "mobile" device throughout the present disclosure, it is also possible in an alternative embodiment for the mobile device 150 to be substituted with a stationary device (e.g., a desktop computer) capable of communication with the lighting management server 110 via a wired or wireless connection.

The mobile device 150 includes one or more network interfaces 158 through which the mobile device 150 is capable of communicating with the lighting management server 110, the lighting systems 130, and in some embodiments, devices outside of the network 120. While, in one embodiment, mobile device 150 communicates via RF communication, the mobile device 150 may instead (or additionally) communicate via infrared or ultrasound technology as appropriate, or via another form of wireless communication. The mobile device 150 is capable of displaying a software-implemented graphical user interface (GUI) 152 that allows the user to view and input information relating to the location of light sources 131 installed in the facility and of transmitting information to the lighting management server 110 as described herein. A user carrying the mobile device 150 may manipulate the GUI 152 to input or identify the particular position of a light source 131, as described in more detail in the present disclosure.

Figure 2:
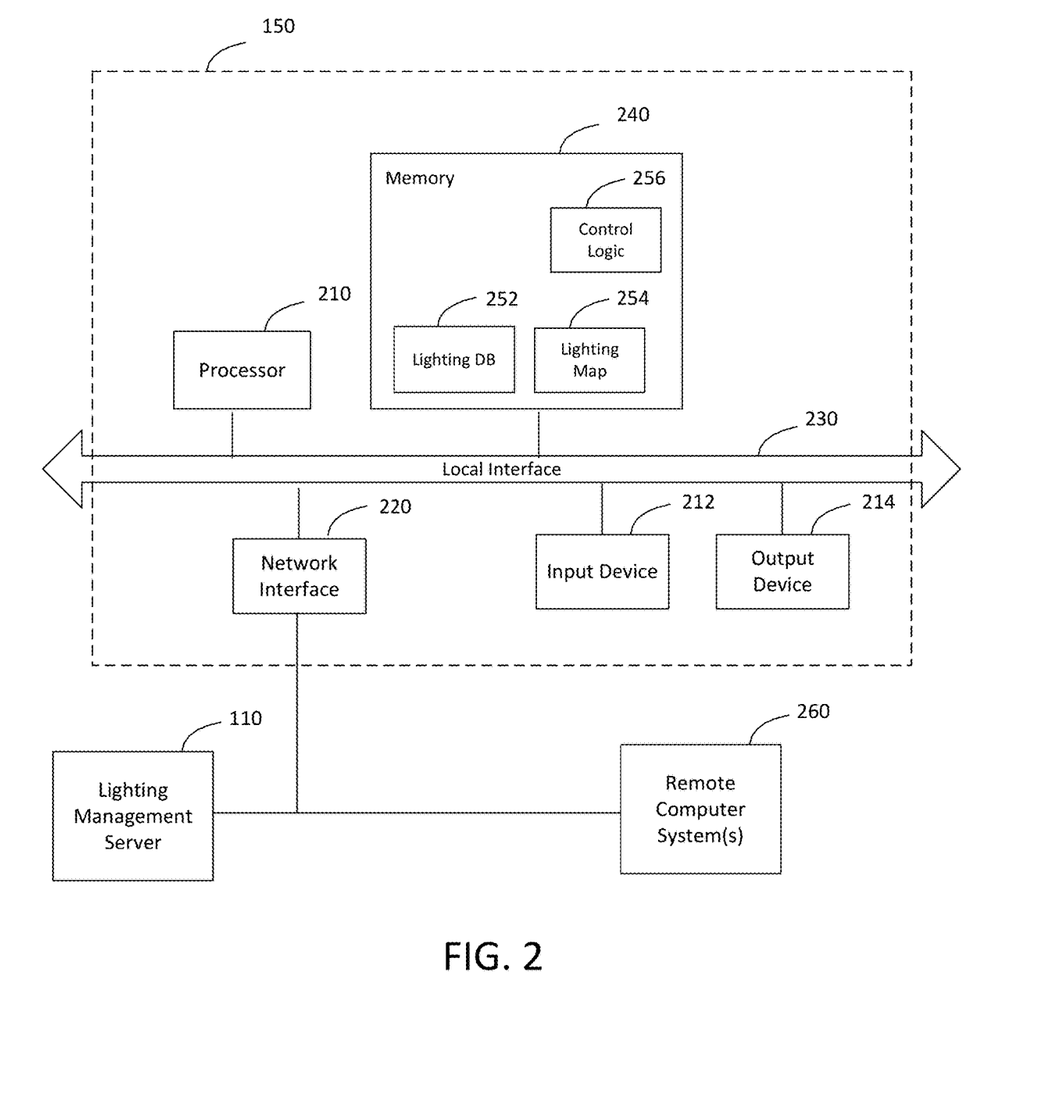
FIG. 2 is a block diagram illustrating an exemplary embodiment of a mobile device as depicted in FIG. 1.

FIG. 2 depicts a mobile device 150 in accordance with an exemplary embodiment of the present disclosure. The exemplary device 150 comprises at least one processor 210, such as a central processing unit (CPU), digital signal processor, other specialized processor or combination of processors, or other circuitry that communicates to and drives the other elements within server 110 via a local interface 230 (for example, a bus).

The mobile device 150 has a network interface 220 for enabling communication (directly or indirectly) with other devices in lighting control system 100, including lighting management server 110, and in some embodiments, devices outside of lighting control system 100. In an exemplary embodiment, network interface 220 enables the mobile device 150 to communicate with other devices on the wireless network 120 via the intermediary gateway 115 (FIG. 1), but the interface 220 may alternately or additionally exchange data via a physical medium.

Mobile device 150 has a memory 240 that stores a control logic 256 for generally controlling the operation of the mobile device 150. The control logic 256 can be implemented in software, hardware, firmware, or any combination thereof. In the embodiment illustrated in FIG. 2, the control logic 256 is implemented in software and is stored in a memory 240. Various other data and code can also be written to or read from memory 240. Control logic 256, when implemented in software, can also be stored on any computer-readable medium, for example electronic, magnetic, or optical mediums, among others, or another system, apparatus, or device. The control logic 256 is implemented by the processor 210 or any other circuitry capable of executing the instructions of the control logic 256.

Control logic 256 may be configured to present to a user of the mobile device 150, via an output device 214 such as a touch-sensitive display, a graphical user interface (GUI). More particularly, the user may, via input device 212 and output device 214, use 152 GUI to perform commissioning of the lighting system 100, inputting information to identify the location of one or more lighting systems 130. In one embodiment, the output device 214 may be a display screen (touchscreen), and the input device 212 may be the touch sensitive components of that display. It will be noted in such an embodiment, that the input/output devices, though shown as separate components in FIG. 2, may make up different elements of a single touch-sensitive device, i.e., a touchscreen. In such an embodiment, the user may interact with the input device 212 via a stylus, a touch by a hand or finger, or other known mechanism. In other embodiments, input device 212 may be a keyboard, trackball, mouse/wheel, or other mechanical component configured to be used to take in information, and output device 214 may be any type of display capable of presenting 2-dimensional information to a user, such as a touchscreen, integral LCD, standalone monitor, etc. In a preferred embodiment, the control logic 256, via the network interface 220, may communicate with the lighting systems 130 and the lighting management server 110 as part of the commissioning. In alternate embodiments, rather than the control logic 256, the mobile device 150 may have a separate user interface logic (not shown) stored in memory 240 storing instructions for presenting the GUI to the user of the mobile device.

The memory 240 of the mobile device 150 also stores a lighting database 252 and a lighting map 254, each containing information related to the commissioning process. The control logic 256 is configured to manage the lighting database 252 and the lighting map 254, and to reference data stored therein. It will be noted that while FIG. 2 refers to a lighting "database" and a lighting "map," the information stored within need not be in a database structure or a map structure, and instead any type of data structure may be used in various embodiments.

The information in lighting database 252 and lighting map 254 is used, by the control logic 256, in the commissioning of the RF network. Namely, lighting database 252 provides a data structure that stores an association of a lighting system 130 (and/or the components thereof) with its respective location in the facility and lighting map 254 contains information sufficient to present the information in the lighting database in the form of a 2D map. During the commissioning of the RF network, lighting database 252 stores a unique identifier 132 for every light source 131 known to be installed in the facility (or a subset thereof), and, once known, information specifying the respective location of each of those light sources 131. In one example, the unique identifier 132 may be a descriptive, meaningful, and/or made up character string, set by the commissioner at the time of installation and/or in advance of commissioning and stored in the lighting database 252, or obtained from the lighting management server 110. An alternative example may include an identifier 132 that is the same as a MAC address of the light source 131. Location information for a light source 131 may be stored in lighting database 252 in a variety of formats, such as coordinates of the light source 131 itself or of another component of the lighting system 130 which contains or is physically near to the light source 131. The lighting database 252 may also contain information about the light source 131 such as whether it is located in a particular room or area, any groups (logical groups) of lights that the light source 131 may belong to, and/or any other appropriate information relevant to the location of the light source.

Control logic 256 may use the information in the lighting database 252 to generate a lighting map 254. This lighting map 254 provides one or more graphical representations of the facility, with designations identifying each light source 131 at its respective location. The lighting map 254 may also include some indication of the status of any particular light source 131, e.g., operating status or commissioning status. Lighting map 254 may be generated based on the information in lighting database 252, data particular to the layout of the facility and the rooms therein, stored information obtained from the lighting management server 110 or another devices 260 remote to the wireless network 120, and/or other information variously stored within memory 240, such as rules directed to the positioning of light sources 130 within the actual space of the facility, among other sources.

In a preferred embodiment, the mobile device 150 obtains data for lighting database 252 and, by proxy, lighting map 254 from the lighting management server 110 via network interface 220. For example, the control logic 256 may be configured to query the server 110 to obtain and/or update such data upon initiation/activation of the GUI by the user. In one embodiment, when the GUI (described further herein) for the commissioning process is activated, control logic 256 obtains from the lighting management server 110 a list of each unique identifier 132 for every light source 131 known to be installed in the facility (or a portion of the facility in which the commissioner/mobile device 150 is located). In an alternate embodiment, the GUI may additionally or alternately obtain data from other remote computer systems 260 that may or may not be part of lighting control system 100, such as a manufacturer server. At the end of the commissioning process (or at one or more intermediate points therein), the control logic 256 may send the information stored in the lighting database 252 and/or and lighting map 254, which have been updated through the commissioning, to the lighting management server 110 so that the updated information can be accessed by any device connected to the network 120.

In some embodiments, the control logic 256 facilitates a real time update of the information in lighting database 252 and lighting map 254 to/from the server 110 and continuously or periodically presents such updated information to the user. Such a solution may be particularly beneficial in implementations where multiple commissioners using multiple devices 150 may simultaneously enter information about various light sources to be stored at a central server. This may allow for each commissioner to be working from the same source information (collected in the respective lightings databases 252) and for the most accurate and up-to-date information to be distributed and displayed. However, real-time data collection and display may add additional computing and/or storage complexity to the mobile device 150.

In yet another embodiment, the control logic 256 obtains/sends lighting information on demand at the request of the user of the mobile device. This alternate implementation may allow the commissioning process to be completed even in circumstances where wireless or wired connectivity is absent or unreliable, or where maintaining an active connection is not preferred, for example to minimize power consumption or network noise. In such embodiments, mobile device 150 stores information from the lighting database 252 and/or lighting map 254, and the information may be later communicated to the lighting management server 110 when a wireless connection is once more available or practical. Memory 240 may preferably, in such an implementation, take the form of a flash memory or any other type of solid-state, non-volatile storage such as memory cards, hard disk drives, solid-state drives, disk storage, or any form of rewriteable storage.

Figure 3A:
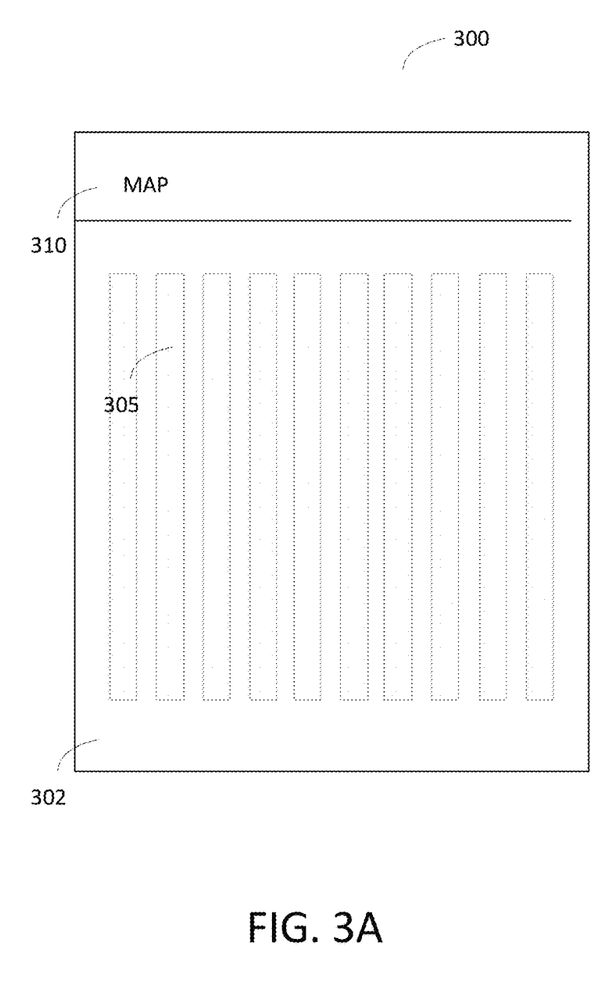
FIGS. 3A-3G are diagrams illustrating exemplary screens of a graphical user interface, in accordance with an embodiment of the present disclosure.

FIGS. 3A-3F depict a GUI 300, and in particular, a series of exemplary screens of a GUI to be displayed on an output device 214, such as touchscreen, that allow a commissioner to enter information associating a unique identifier 132 of a light source 131 with the installation location of that light source within the facility. Of course, it will be understood that the embodiments are not limited to the depicted screens, and that the GUI may present to the user any of a plurality of layouts and/or any number of screens, so long as it allows the user to perform at least the functionalities described herein. FIG. 3A depicts a first screen of the GUI, in accordance with a first embodiment, displayed to the commissioner on his mobile device 150. The GUI may include, in the illustrated embodiment, a header section 310 and a content section 302, though other sections in other configurations may be possible in other embodiments. In the first screen illustrated in FIG. 3A, header section 310 identifies the first screen as a "MAP" screen, while the content section 302 displays a map of all or a portion of the facility in which the user is attempting to commission lights. The displayed map may be generated based on the stored lighting map 254, in some embodiments, as well as other information in memory 240. FIG. 3A illustrates a scenario in which no lighting information has yet been entered, that is, installation of the light sources 131 is complete but commissioning has not yet begun. In other embodiments (not shown) where some amount of commissioning has already been performed, upon activation of the GUI, the map displayed to the user may include one or more already-commissioned light sources, based on information from lighting map 254 and/or lighting database 252.

FIG. 3A depicts a plurality of vertically-oriented rectangles 305. Each of rectangles 305 can be understood as delineating an "aisle" in the facility. For example, aisle 305 may correspond to a shelving area, a pathway, or other area of the facility that may be lit by the light provided by the one or more installed light sources. In a preferred embodiment, the aisles act as columns or rows in the facility in which lights are installed, though it will be understood that such rows/columns need not be strictly rectangular and may take any appropriate shape. In alternate embodiments, aisles 305 may not be actual "aisles" but may merely act as landmarks in the facility from which the commissioner can identify or orient positions of lights in the GUI. For example, in some embodiments, the aisles 305 may represent moveable shelving that may not (or may not always) directly correspond to the physical rows in which a light source may be installed within a building. While FIG. 3A depicts ten aisles 305 positioned vertically in the content section 302, it will be understood that in different embodiments, any number of aisles 305 may be displayed, in any appropriate direction and orientation. For example, where a facility (e.g., a warehouse) has horizontal, diagonal, L-shaped, or curved shelving, the depicted aisles may correspond to such layout.

Figure 3B:
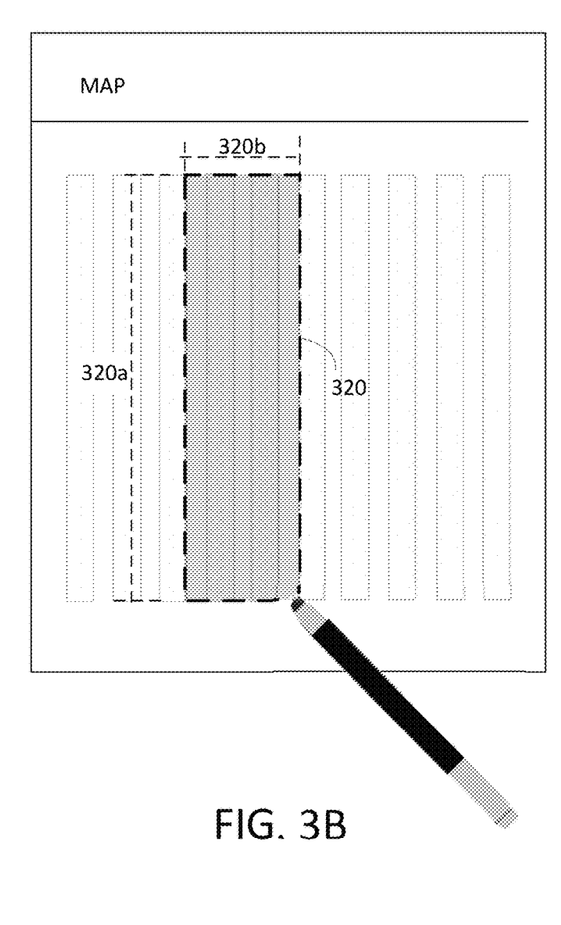

FIG. 3B depicts a second screen of the GUI in which a commissioner has input an area in which he intends to commission one or more lights. Through use of an input device, the commissioner has specified in the content section 302 a rectangular area 320. Although this area is referred to herein as "rectangular," other embodiments need not be limited to strictly rectangular inputs, and the selected area may take any appropriate shape. Rectangular area 320 represents the space on the map in which the commissioner intends to identify certain light sources. The illustrated rectangular area 320 is of a vertical length 320a and a horizontal length 320b, both dimensions being contained within the bounds of the map displayed in the content section 302. Alternate embodiments may implement content section 302 as a scrolling display where the length and height of the map may extend beyond the visible edges of the display in any of the cardinal directions. In such alternative embodiments, the selected area 320 need not be limited in size to the portion of the map visible on the display at any given time. In the illustrated embodiment of FIG. 3B, the input device used by the commissioner is a stylus or finger applied to touch-sensitive portions of a touch-screen display, however a mouse (in which case a cursor or crosshairs may be shown on the display device) or any other appropriate input device may be used in other embodiments.

Figure 3C:
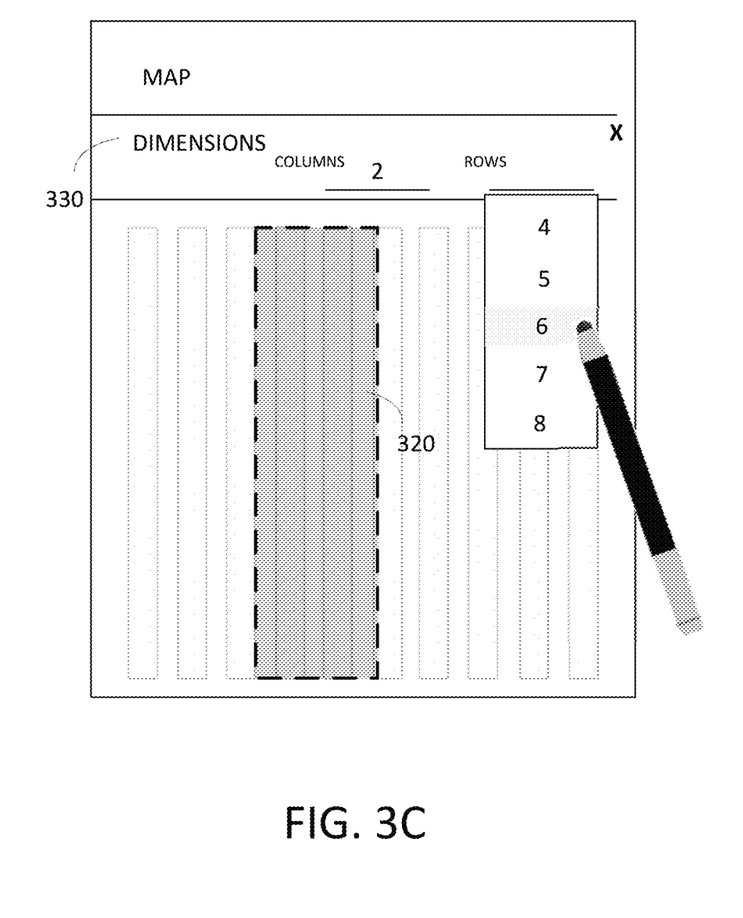

FIG. 3C depicts a third screen of the GUI through which the commissioner may input information corresponding to a number of light sources located within the identified area 320. As depicted, after the commissioner specifies the rectangular area 320, the GUI presents a section 330 (e.g., a "Dimensions" section) in which the commissioner may specify a number of rows and a number of columns of light sources actually installed in the portion of the facility corresponding to rectangular area 320. As in the embodiment of FIG. 3C, the GUI may present in some embodiments a drop down or scrolling selection of a number of rows, where selection may be made through the input device (e.g., swiping/tapping a stylus or finger on a touchscreen). Alternately, rather than "rows" and columns," the GUI may request a "width" and "height" value, corresponding to, e.g., a number of lights or a distance, or any other appropriate factor of measurement. In alternate embodiments, the GUI may instead accept a text-based input from, e.g., a number pad or keyboard (either physical or displayed), a voice input, or any other appropriate means of data entry.

The GUI of the preferred embodiment is configured to dynamically generate and display installation positions for the installed light sources within the selected lighting area. This is done, in the illustrated embodiment, in response to the entry of the dimension information. Put another way, a "grid" of lighting positions is created, where each intersection of row and column corresponds to a position at which a light is installed in the facility. In one embodiment, a plurality of empty lighting positions are dynamically and automatically created and populated into the rectangular area 320 drawn in by the commissioner, so as to show the positions of the lights superimposed on the previously-displayed map of the facility. These positions, shown in FIG. 3D as white circles 332 within rectangular area 320 (though any appropriate icon may be used), are intended to correspond to the actual installation points in the facility of one or more light sources. In the illustrated embodiment, these positions are generated so as to be spaced equidistant from each other within the area 320 that the commissioner has defined. In the preferred embodiment, the positions 332 are arranged in a symmetrical pattern. In another embodiment, memory 240 may store logic (in some embodiments, control logic 256) to implement pre-set guidelines as to the distances at which the light positions 332 should be set within the rectangular area 320 from each other and the boundaries of the area, which distances may depend, for example, on the type of the building, the height of the ceiling, the type of lighting, architectural details, and/or other relevant factors.

Figure 3D:
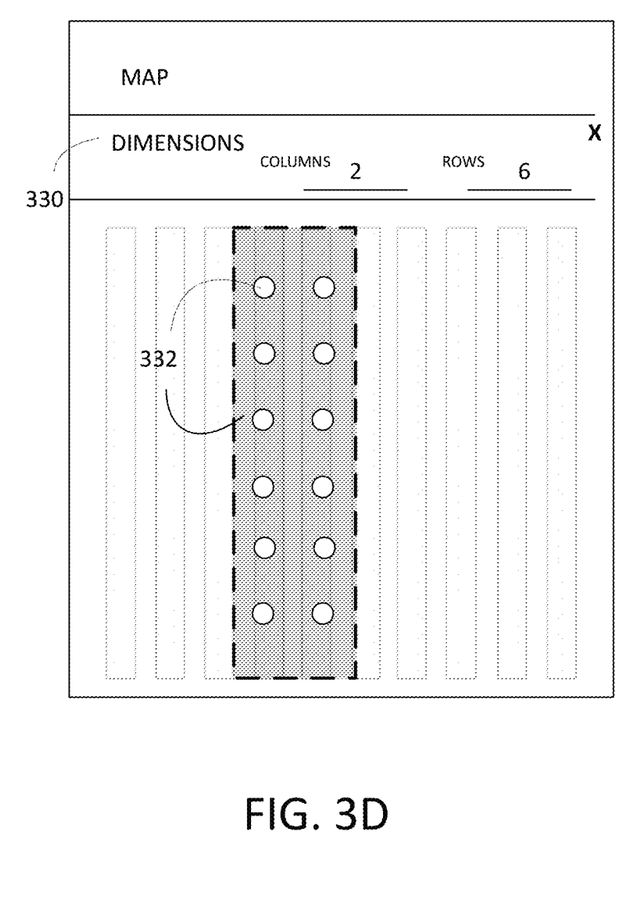

Note that the spacing and locations of the light positions 332 are based on the size of the rectangular area 320 and the number of light positions 332 specified for the rectangular area 320. For example, increasing a size of the rectangular area 320 in one direction (e.g., vertically or horizontally) results in an increase in spacing between the light positions 332 in the same direction, and conversely decreasing a size of the rectangular area 320 in one direction results in a decrease in spacing between the light positions 332 in the same direction. Further, specifying a larger number of light positions within a given rectangular area 320 generally results in decreased spacing between the light positions 332. Once the light positions 332 are generated at default locations within the rectangular area, the commissioner may adjust the light positions 332, as will be described in more detail below, so that each light position 332 corresponds more precisely to a physical location of a light within the facility.

Figure 6A:
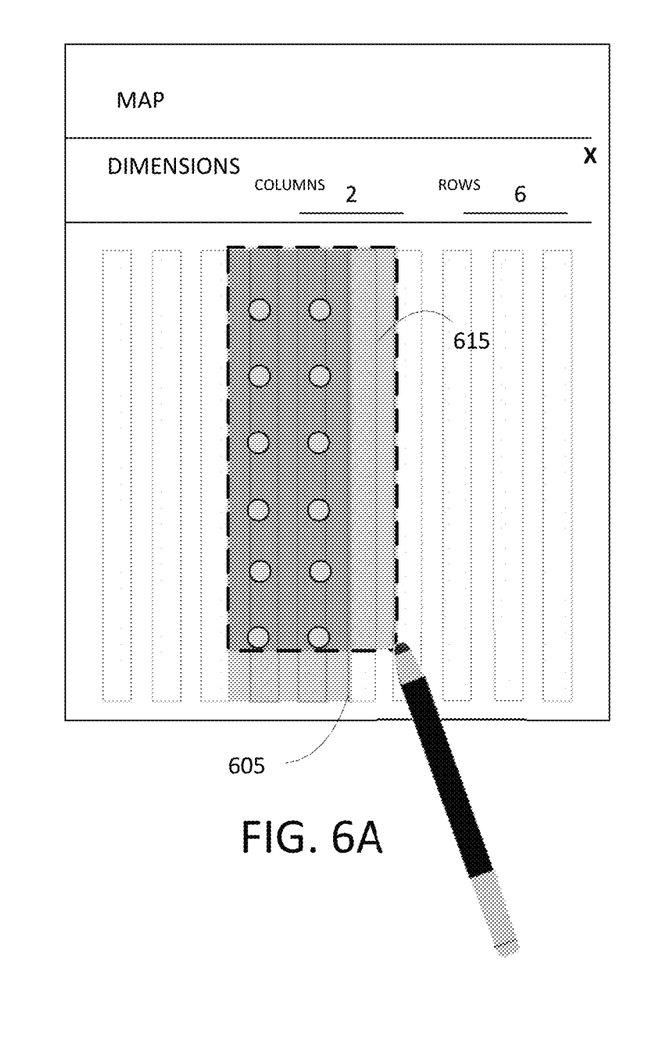
FIGS. 6A and 6B are diagrams illustrating exemplary screens of a graphical user interface, in accordance with an embodiment of the present disclosure.
Figure 6B:
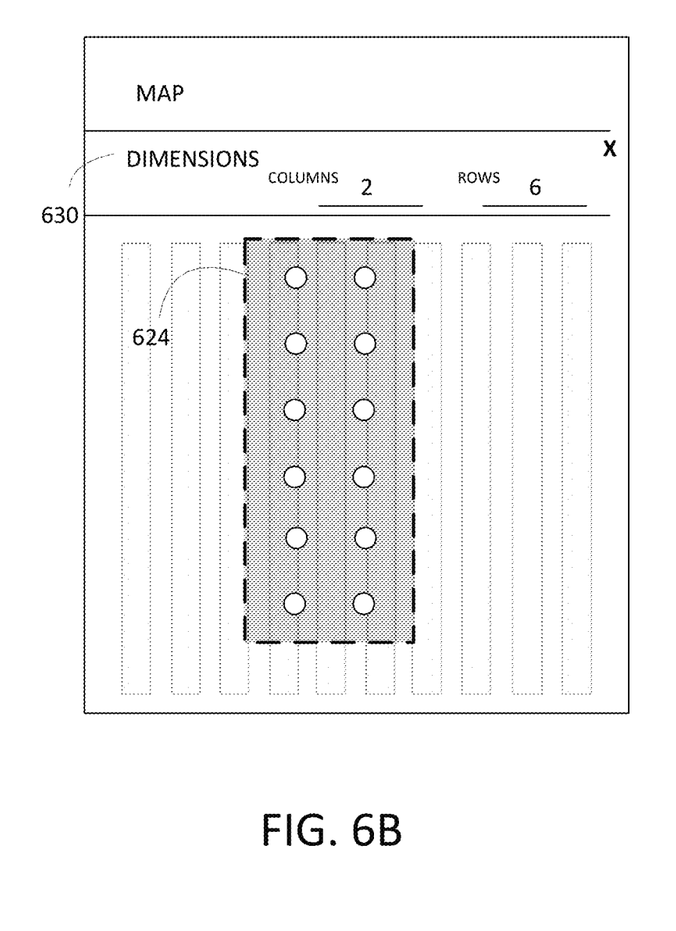

In this regard, the commissioner may verify and/or correct the accuracy of the placement of the lighting positions 332 against the actual installed locations of the light sources within the facility. Any of a variety of methods may be used to verify the locations of the lights, such as visual inspection of the light or a label on or near the light, controlling a light to turn on/off or blink or change in intensity, or any other appropriate identifying function. If the positioning is inaccurate, the location of the positions 332 in the designated rows and columns may, in some embodiments, be modified by the user through a resizing of the rectangular area 320. For example, with reference to FIG. 6A, the commissioner, having already selected a number of columns (e.g., 2) and a number of rows (e.g., 6) within a rectangular area 605 may then resize that rectangular area, keeping the same column/row dimensions. In the embodiment of FIG. 6A, this resizing is done through a drag and drop of a corner of the rectangular area through use of a stylus (or other alternate form of input, e.g., finger, mouse, etc.) so as to create a new rectangular area 615. As shown in FIG. 6B, upon resizing of the area, the GUI may be configured to dynamically reshape the lighting positions 332, moving the positions so as to follow the same dimensions provided by the commissioner (e.g., 2 columns and 6 rows, shown in dimensions section 630) while fitting entirely within the newly-drawn rectangular area 615. That is, in response to a resizing of the rectangular area, the GUI may move the lighting positions 332 in unison so that their locations accommodate the size and location of the new rectangular area according to the techniques described above. The arrangement of the lighting positions is done in a manner similar to that of FIG. 3D, that is, the positions are, in the preferred embodiment, located equidistant from each other. However, it will be understood by a comparison of FIGS. 6A and 6B that while the number, dimensions, and order of the lighting positions have remained the same, the placement of those positions relative to the displayed map and their positions relative to each other have changed.

In addition to resizing the rectangular area, the commissioner may move the rectangular area, causing the light positions 332 to be moved in unison by a corresponding amount, in an effort to more precisely locate the light positions 332 on the map. There are various techniques that can be used to move the rectangular area 320. In some embodiments, the rectangular area 320 may be moved by drag and drop operation using a stylus or finger, but other techniques may be used in other embodiments, for example an alternative type of touch on a touchscreen (e.g., multi-finger touch, swipe, etc.), the use of arrow keys or sliders, or the like. By adjusting the size and location of the rectangular area in the manners described above, the commissioner may precisely locate the positions of a plurality of lights on a map to correspond to the real-world placement of a plurality of installed light sources. In alternate embodiments, the commissioner may also change the input row/column dimensions, and the GUI will in response dynamically regenerate the lighting positions 332 to conform to the newly-entered dimensions, with a new total number of lighting positions, if appropriate.

In some circumstances, the commissioner may determine that one or more lights installed in the facility are not actually positioned so as to be equidistant from another light. To address this, a commissioner may in one embodiment repeat the GUI's commissioning process (described in greater detail below) several times with differently dimensioned rectangular areas 320, so as to precisely place different subset groups of light sources into their correct positions. In other embodiments, the GUI may be configured to allow the commissioner to move a single generated white circle marking position 332 on the map (for example through a drag and drop input) to individually locate or relocate (or delete) the position of one light of the created group of lighting positions. By these means, when the structure of the facility does not permit one or more lights to be placed in an expected equidistant or symmetric location, or the lights were not so installed, a precise and accurate location can still be made on the lighting map through the GUI 300.

Figure 3E:
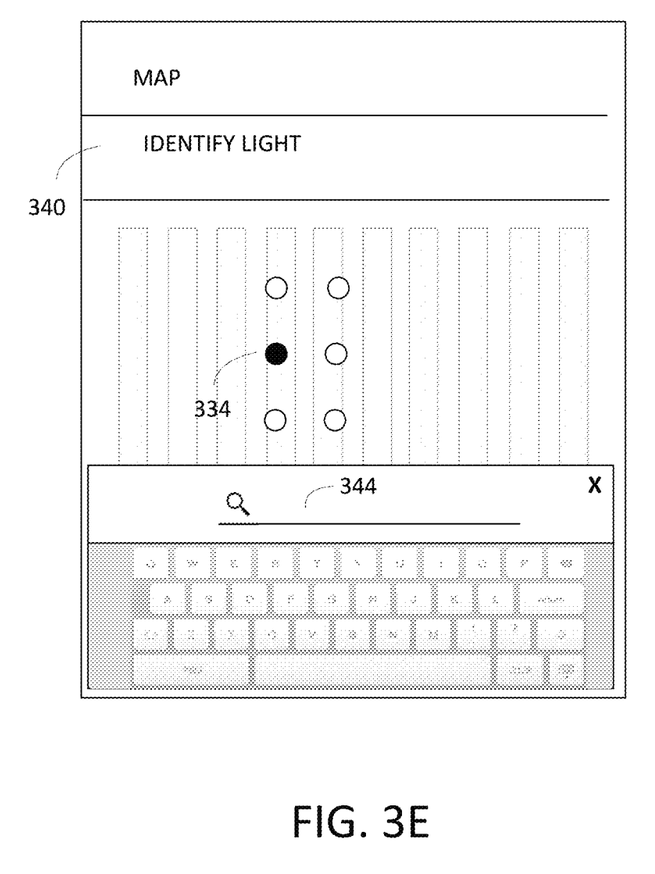

Each of the positions in the rectangular area is separately selectable and editable by the commissioner through the GUI 300. With reference to FIG. 3E, the GUI may display a screen (e.g., labeled as "Identify Light" in header 340) through which the user may use the input device to select a position 334 of the multiple positions 332, for example by tapping the position (with a stylus or finger) or by cycling through selections of positions 332 (with, e.g., arrow keys). By selecting a position 334, the commissioner can associate that position with a particular light source, or, more particularly, with the light source's unique identifier. In alternate embodiments, rather than a targeted selection of a position 334 by the commissioner, the GUI may control selection so as to automatically cycle through the positions in an ordered fashion (e.g., individually by row or by column). FIG. 3E illustrates a selected position 334 as a black circle, and the unselected positions 332 as white circles.

The exemplary mobile device 150 stores, in its lighting database 252, a searchable and selectable set of identifiers for association with the lighting positions, having obtained such information from lighting management server 110 in the manner described above. In some embodiments, this list may be an exhaustive set of identifiers of all of the lighting systems installed in the facility. In other embodiments, this list may be limited to devices that are intended to be commissioned in a given area, devices that have not yet been commissioned, or another subset of devices installed in the facility. In still other embodiments, the list may not be a list of predetermined identifiers, but instead may be a dynamically generated set of unique identifiers.

Figure 3F:
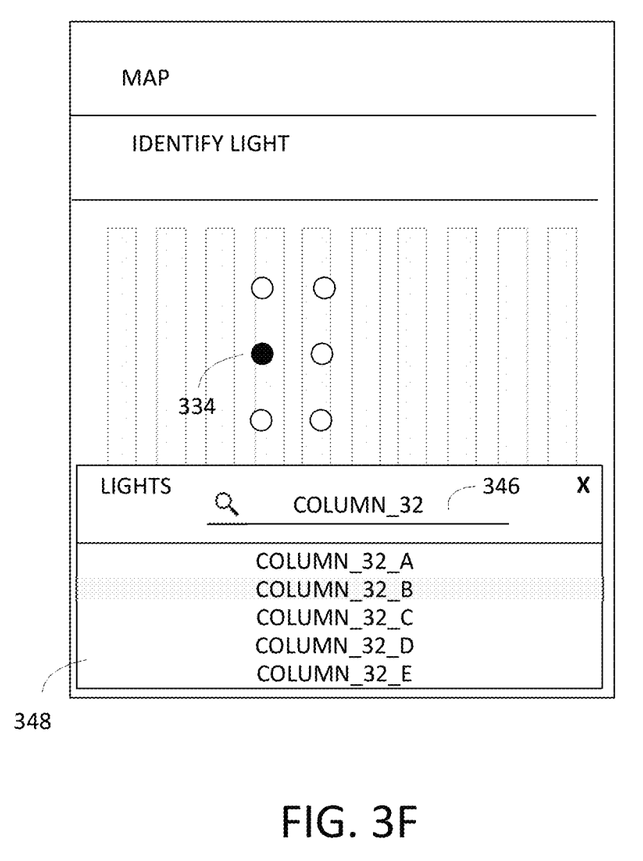

FIGS. 3E and 3F depict screens of the GUI through which a commissioner may enter information, such as the light's name or identifier, after selecting a particular position 334. FIG. 3E depicts a virtual keyboard interface 344 through which a commissioner may type a search term, though any appropriate input device may be used in other embodiments, e.g., a number pad or physical keyboard, a voice input, etc. FIG. 3F depicts a screen where the commissioner has already searched for the search term 346, for example, "COLUMN_32." A list of search results 348 containing the searched-for term has been presented in response to the search, where the search results 348 present a list of known identifiers that contain the search term. A search term may be any character string, but in the preferred embodiment, the commissioner will search for a string 346 that makes up all or a part of a known identifier. In alternate embodiments, the searched-for value may correspond to a characteristic or a tagged value (such as a location) associated with a light in lighting database 252. In some embodiments, the search results 348 may appear on the display screen dynamically as the search term 346 is being entered, and in alternate embodiments, the commissioner may initiate the search function after the search term has been entered.

In the example illustrated in FIG. 3F, the commissioner is attempting to find all identifiers containing the phrase "COLUMN_32" among all of the identifiers for lights in the facility. Of course, it will be understood that "COLUMN_32" is merely an example of a portion of an identifier, that an identifier need not be limited to reciting a row/column number, coordinates, or any particular type of information, and that a light labeled with "column 32" need not necessarily correspond to a particular aisle 305 or a column of lights within the rectangular area 320 or on the map. As described above, in alternate embodiments, an identifier may variously represent the location of a light within the facility (e.g., "storage" if located in a storage area), a characteristic of the light (e.g., the identifier may include the word "motion" if motion-activated or "IF" for infrared), an installation order (e.g., "01," "02," etc.), and/or any appropriate alphanumeric string. Of course, any identifier may be used in the commissioning process, and the character string used in identification need not by itself necessarily convey information. Rather, the identifier need only be a character or numeric string that uniquely identifies a light in the facility, where such identifier can be associated with other information in the lighting database 252 and/or at the lighting management server 110.

In one embodiment, the user may select (by, e.g., tapping) the desired identifier of the light from the displayed known list of identifiers 348. In the illustration of FIG. 3F, the commissioner has selected the identifier "COLUMN_32_B." Once the commissioner has made his selection, the GUI associates the selected identifier (which corresponds to a light source 131) with the location of that light source, and then stores those two pieces of information in lighting database 252. Where the lighting database 252 already contains location information associated with the selected identifier, control logic 256 may, in a preferred embodiment, overwrite the existing information in lighting database 252 with updated information, for the sake of efficiency of the commissioning process. In an alternative embodiment, in a case that the existing location information for the identifier in the lighting database 252 conflicts with the location information received through the GUI, the control logic 256 may take note of the conflict and may transmit, via the GUI, a query to the commissioner as to whether to overwrite the existing information. The commissioner may then confirm or reject overwrite as appropriate. If the identifier selected by the commission is not yet associated with a location in the lighting database 252, the relevant information for the light source and its corresponding location should be added to the lighting database 252.

In yet another embodiment (not shown), rather than an individual selection of a lighting position 332 by the commissioner, the GUI may query the commissioner as to the location of a light identified by a particular identifier. That is, the GUI may be configured to display to the user an identifier known to relate to a particular light source 131. The user may then locate the light source (e.g., by visual inspection) and may identify, through the same mechanisms illustrated in FIGS. 3A-3F, the particular location of the light source. Such an implementation may be useful in avoiding human error where a commissioner may unintentionally fail to identify the location for a particular light source.

At the end of the commissioning process, or at any appropriate point in the process, the mobile device 150 can transmit the set of information containing any or all of the light source identifiers and their respective locations to the lighting management server 110 via the network 120. In some embodiments, this transmission is performed by the GUI 300, however, in other embodiments, control logic 256 or a separate transmission logic (not shown) may be configured to do so. As described above, this transmission is done through network interface 220 of the mobile device 150. If the size of the memory 240 of the mobile device 150 does not permit storage of any or all of the lighting information, then the mobile device 150 may instead transmit the information in lighting database 252 to lighting management server 110 periodically during commissioning (at a set interval of time) or after every write operation to lighting database 252. While the information can be transmitted to the lighting management server 110 in many forms (e.g., a table, a map, a set of coordinates), it is understood that the identifier 132 of the light source 131 is sent in a manner in which it is associated with information sufficient to identify the location of the light source 131.

Figure 3G:
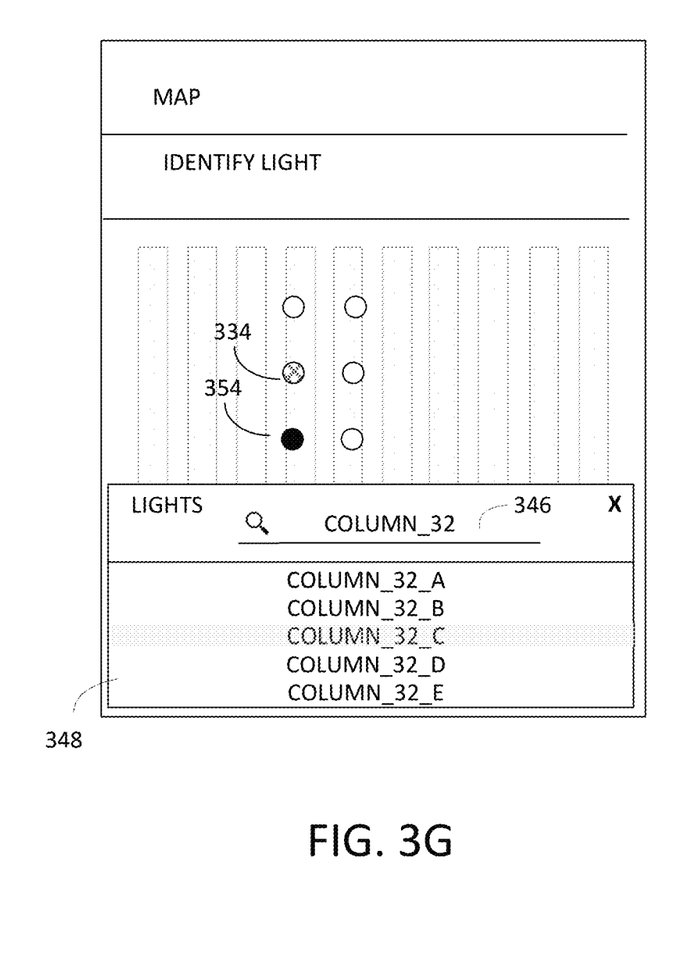

After a light source's identifier and location have been associated in lighting database 252, the respective light source can be understood as having been "commissioned" through the GUI. A user may commission any number of light sources at one time. If the user wishes to commission a second (or third, or $n^{th}$) light, he may simply select another, uncommissioned lighting position 332 in the same manner that position 334 was selected (e.g., via a touch by a stylus or finger, or alternate method of selection). FIG. 3G illustrates a second selected position 354 as a black circle, previously-commissioned position 334 as a patterned circle, and uncommissioned lighting positions as white circles.

It can be seen with reference to FIG. 3G that the GUI may in a preferred embodiment still display the previously searched-for field 346 and search results 348 even after a second lighting position 354 has been selected for commissioning. In this embodiment, the previous search results may remain displayed until the search is cancelled or another search value 346 is input. This is because, in many common networks, light sources 131 positioned close to each other in a facility may be assigned similar or related identifiers. In one example, light identifiers in a particular room or area of a facility may be assigned identifiers that share a particular prefix or character string, thereby making it relatively easy for a commissioner to obtain the identifiers for several closely-positioned light sources in the search results of a single search. In the illustrated embodiment of FIGS. 3E-3G, the commissioner is attempting to commission multiple light sources in a single column, "column 32," and the GUI has generated a complete list of identifiers containing this string in search results 348. By continuing to display this list even as the commissioner selects different light sources for commissioning within the same column of lights, the commissioner may quickly move or scroll through only a limited set of relevant search results 348 without having to repeatedly perform an identical (or similar) search. In the illustration of FIG. 3G, the commissioner has selected the identifier "COLUMN_32_C," which also appears in the search results 348 shown in FIG. 3F. In an alternate embodiment (not shown), where identifiers are generated at the time of installation in the order the light sources were installed, identifiers corresponding to light sources positioned close to each other may be sequentially numbered. A commissioner may quickly commission light sources in this alternate embodiment by causing the display, in field 348 of the GUI, of all identifiers in sequential order. As the commissioner proceeds to select another (e.g., adjacent) lighting position 332, the search results 348 remain positioned on the previously-selected identifier, allowing the commissioner to quickly find a closely-numbered (e.g., adjacent) identifier without scrolling or additional search. By these means, a commissioning agent may quickly, without changing a search term, commission a row or column of lights in the GUI with a minimal number of manual inputs.

By pre-positioning the lights, the GUI may save time and effort for the commissioner that would otherwise be used in individual placement of lights on a map one at a time. In addition, by associating the light's identifier with the position, additional information can be associated with the device. For example, if the commissioning agent were to pre-assign meaningful names to the lights (e.g., a name representing its function or placement in the building), such names can be stored in memory. In one embodiment of the disclosure, the GUI provides search and/or selection functionalities that allow for association of a lighting position with the desired name, and updates that position information on a 2D map.

Figure 4:
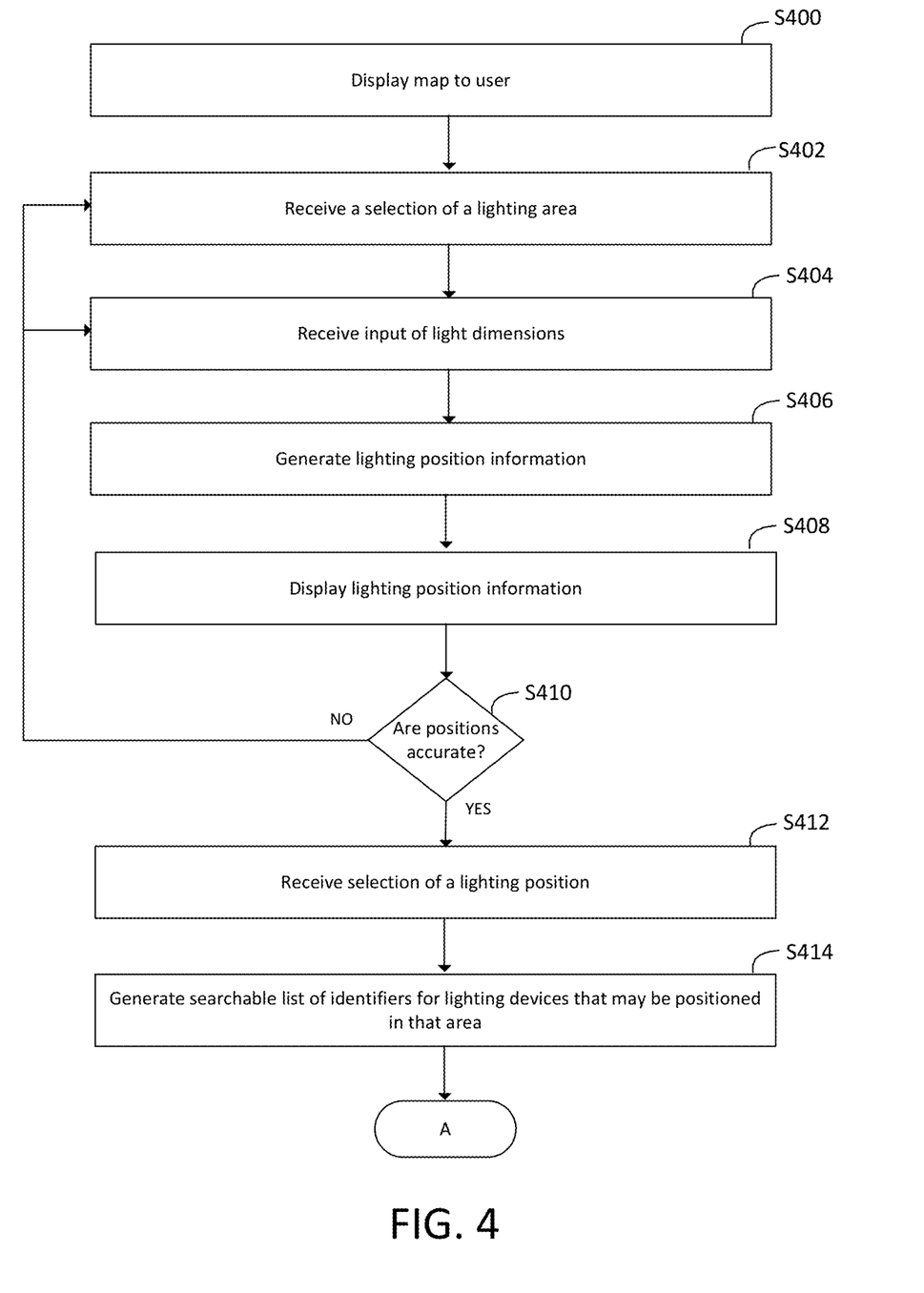
FIG. 4 is a flowchart depicting a first process of commissioning a lighting system, in accordance with an exemplary embodiment of the disclosure.

FIG. 4 depicts a first exemplary process for commissioning lights in a lighting system. The process begins in step S400 with the display of a map to the user. In a case that no commissioning of light sources has taken place, the map will be displayed without any lighting positions. However, if one or more lights have already been commissioned, these lights may be displayed on the map at their respective locations. The user may interact with this map to specify a rectangular area in which the lights he wishes to commission are located. The GUI receives this input of a specified lighting area in step S402.

Once the lighting area has been selected, the GUI may present to the user an input field for receiving an input of dimensions (step S404), e.g., a number of rows and a number of columns corresponding to the number of lights that are actually installed in the area of the facility corresponding to the lighting area selected in step S402. In step S406, the GUI dynamically generates lighting position information, including the particular positions of the lights within the facility. Lighting positions are configured in uniformly-distributed locations within the lighting area, in the dimensions received in step S404. These positions, once generated, are displayed to the user, in step S408, so as to be superimposed on the map of the facility. The user is able to determine visually whether the lighting positions are accurately placed and whether they correspond to the actual positions of the lights installed in the facility that the user intends to commission (step S410). If the positions are inaccurate, the user may modify the positions of the lights by modifying the input information. For example, if the number of lights (or their arrangement into rows/columns) is inaccurate but the lighting area is correct, the process may return to step S404, where the GUI receives a new input of light dimensions. In another circumstances, for example, if the area or positioning of the lights is inaccurate, the process may return to step S402, where the GUI receives a new selection of a lighting area (e.g., by the user's resizing, moving, or redrawing).

Once the user has confirmed that the lighting positions displayed on the GUI conform to the actual position of the lights, the process advances from step S410 to step S412, in which the GUI may receive a selection of one of the displayed lighting positions, e.g., through a touch selection. The GUI then generates, in step S414, a searchable and selectable list of identifiers (for example, a list of predetermined device names), through reference to the lighting database 252. The process may then proceed to point A, from which point the user may create an association between an identifier and a particular light.

Figure 5A:
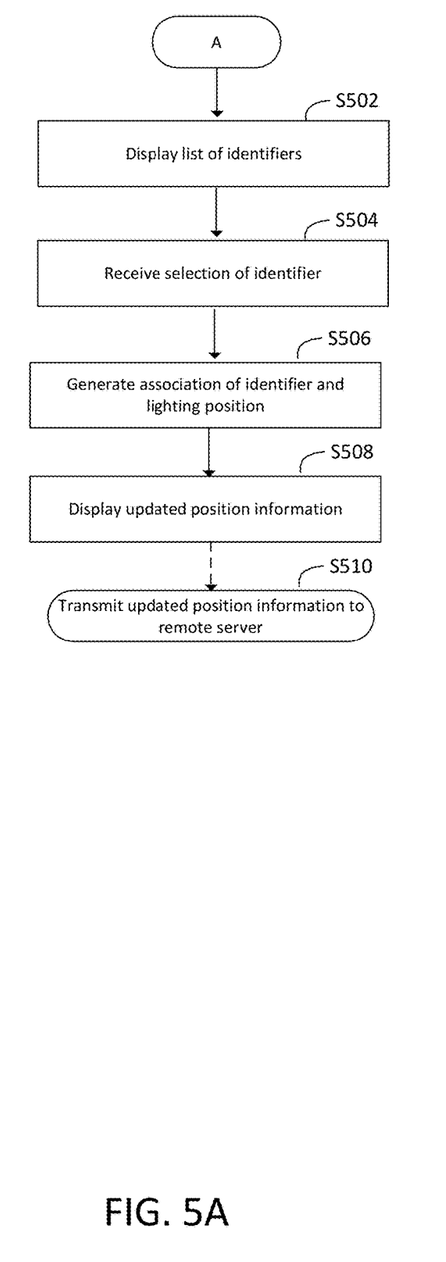
FIG. 5A is a flowchart depicting a second process of commissioning a light system, in accordance with an exemplary embodiment of the disclosure.
Figure 5B:
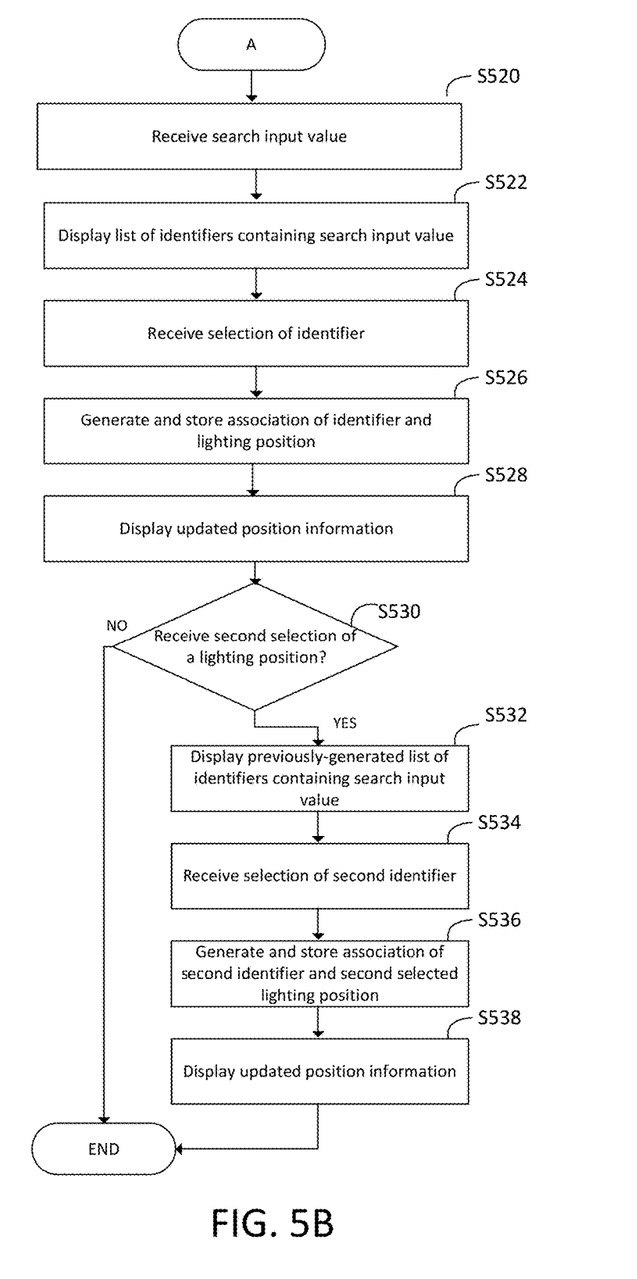
FIG. 5B is a flowchart depicting a second process of commissioning a light system, in accordance with an alternate exemplary embodiment of the disclosure.

FIGS. 5A and 5B depict alternate second exemplary processes for commissioning lights, both of these alternate processes commencing from point A. FIG. 5A sets forth the flow of a simple selection from the generated list of identifiers. For example, the process of FIG. 5A may commence in a circumstance where the user simply scrolls through the list of identifiers, and selects one of the identifiers. In particular, the GUI displays the complete list of identifiers (step S502) and receives a selection of an identifier from the user, e.g., via a touch screen (step S504). Once the identifier has been selected, the control logic 256 associates the selected identifier with the selected lighting position in lighting database 252 in step S506. The GUI may then, in some embodiments, present an updated screen to the user in step S508, for example, showing the identifier the appropriate position for the light that was commissioned, or otherwise designating that the light at that position has been commissioned (e.g., displaying the circle representing the position in an altered color or pattern). Once the user has finished the commissioning process (for example, by closing the GUI or making an input indicating completion), the GUI may, in step S510, transmit lighting information from the lighting database 252 to lighting management server 110. In some embodiments, only information updated or altered during the commissioning will be transmitted, however, in alternate embodiments, the entire contents of the lighting database 252 may be transferred.

FIG. 5B illustrates a process in which a user searches the list of generated identifiers for one or more identifiers to match with one or more selected lighting positions. In step S520, the GUI receives, through an input field, a search input value. In the preferred embodiment, this search input value is a character string making up all or a portion of the name of a known identifier. In response to the entry of search field, the GUI displays a list of search results (made against the generated list of identifiers) that contain or correspond to the search input value (step S522). This list is individually selectable, so as to allow a user to move or scroll through the results and select the appropriate search result therefrom (step S524). The selected search result is an identifier that is associated, in step S526, with the selected position in lighting database 252. The GUI may then, in some embodiments, present an updated screen to the user in step S528, with visible differentiation of the lighting position that has already been commissioned.

If the user wishes to commission a second light, he may then, through for example a touch input, select from the updated display a second lighting position, which selection is received by the GUI in step S530. In the preferred embodiment, rather than generate a wholly new list of selectable identifiers, the GUI instead presents to the user (step S532) the same search results that were generated earlier (in step S526). By these means, the user can find similar identifiers for lights that are located close to each other, without an extra search step. As before, the previously-generated list is selectable, so as to allow a user to move or scroll through the results and select the appropriate search result therefrom (step S534). The selected second identifier is associated with the selected second lighting position (step S536) and the display is updated (step S538) in a manner similar to that previously-described with respect to steps S526 and S528.

The systems and methods described above provide a way to identify a light source of interest even in a lighting installation that was not installed in any predefined configuration, and even where an installer did not have any knowledge of light identifiers. Accordingly, the process of installing and identifying lights is simplified, and errors that otherwise could arise by an installer incorrectly installing light sources relative to the light identifier mappings used by the system are mitigated or prevented. Further, because the lighting system described herein uses, e.g., standard LEDs, rather than specialized lights, the high costs of a specialized lighting configuration can be allayed.

This disclosure may be provided in other specific forms and embodiments without departing from the essential characteristics as described herein. The embodiments described are to be considered in all aspects as illustrative only and not restrictive in any manner.

Now, therefore, the following is claimed:

1. A mobile device for use in commissioning lights at a facility, the mobile device comprising a display screen and a memory storing instructions that, when executed, cause the mobile device to:
   display, to a user of the mobile device, a map on the display screen;
   detect a first user input for selecting a lighting area of the map;
   detect a second user input comprising data indicating (a) a number of rows of a plurality of lights in the selected lighting area, and (b) a number of columns of the plurality of lights;
   display, on the display screen in response to the second user input, a plurality of icons within the selected lighting area based on the second user input, each of the plurality of icons representing a respective one of the plurality of lights;
   detect a third user input for adjusting a position of at least one of the plurality of icons within the selected lighting area of the map;
   detect a fourth user input for selecting the one of the plurality of icons;
   detect a fifth user input, the fifth user input being associated with a selection of a lighting identifier identifying the light represented by the one of the plurality of icons;
   based on the fourth user input and the fifth user input, associating the adjusted position with the lighting identifier; and
   enable a server to commission the light represented by the one of the plurality of icons by transmitting to the server data indicating that the adjusted position is associated with the lighting identifier.

2. The mobile device of claim 1, wherein the display screen comprises a touch-sensitive surface, and wherein the mobile device comprises one or more sensors configured to detect a user input made via contact with the touch-sensitive surface.

3. The mobile device of claim 1, wherein the display of the plurality of icons in the first lighting area comprises:
   generating a grid of icons in accordance with the number of rows and the number of columns specified in the second user input; and
   storing, in the memory, position information for each of the icons in the grid,
   wherein each of the plurality of icons is respectively associated with a subset of the stored position information.

4. The mobile device of claim 1, wherein the plurality of icons is located on the map so as to be spaced apart from each other within the first lighting area by a standard distance.

5. The mobile device of claim 4, wherein the standard distance by which the icons are spaced apart is calculated based on one or more of: (a) a size of the selected lighting area, (b) the size of the selected lighting area with respect to a size of the map, and (c) the second user input.

6. The method of claim 1, wherein each of the plurality of icons is individually selectable, and wherein, in response to the detection of the fourth user input, the user of the mobile device is prompted to enter the fifth user input, the fifth user input corresponding to a lighting identifier uniquely identifying the light represented by the one of the plurality of icons.

7. The mobile device of claim 1, wherein the instructions, when executed, further cause the mobile device to:
   resize the first lighting area based on the third user input; and
   move the plurality of lighting positions within the resized first lighting area in unison in response to resizing of the first lighting area based on the third user input.

8. A method performed by a mobile computing device comprising a display, the method comprising:
   displaying a map on the display, the map displaying the positions of one or more lights;
   receiving, with the mobile computing device, a first user input for selecting a lighting area on the map;
   receiving, with the mobile computing device, a second user input comprising data indicating (a) a number of rows of a plurality of lights in the selected lighting area and (b) a number of columns of the plurality of lights;
   displaying on the display a plurality of icons within the selected lighting area in response to the second user input, each of the icons representing a respective one of the plurality of lights;
   receiving, with the mobile computing device, a third user input for adjusting a position of at least one of the plurality of icons within the selected lighting area;
   receiving, with the mobile computing device, a fourth user input for selecting the one of the plurality of icons;
   receiving, with the mobile computing device, a fifth user input corresponding to a selection of a lighting identifier identifying the light represented by the one of the plurality of icons;
   storing, in a memory, an association between the adjusted position and the lighting identifier based on the fourth user input and the fifth user input; and
   enabling a server to commission the light represented by the one of the plurality of icons, wherein the enabling comprises transmitting to the server data indicating that the adjusted position is associated with the lighting identifier.

9. The method of claim 8, wherein the map is a two-dimensional map of an indoor space, and wherein the selected lighting area is rectangular in shape.

10. The method of claim 8, wherein the plurality of icons is displayed such that each of the plurality of icons is spaced apart from another of the plurality of the lighting positions by a standard distance.

* * * * *